Aug. 13, 1968     B. FITZSIMMONS     3,397,021

AXLE BEARING CONSTRUCTION

Filed March 14, 1966

INVENTOR
BRIAN FITZSIMMONS
BY
Gravely, Lieder & Woodruff
ATTORNEYS

United States Patent Office 3,397,021
Patented Aug. 13, 1968

3,397,021
AXLE BEARING CONSTRUCTION
Brian Fitzsimmons, Canton, Ohio, assignor to The Timken Roller Bearing Company, Canton, Ohio, a corporation of Ohio
Filed Mar. 14, 1966, Ser. No. 533,949
3 Claims. (Cl. 308—236)

ABSTRACT OF THE DISCLOSURE

A bearing unit for an axle in which the position of the bearing cone is maintained substantially constant by a locating collar which is flexibly connected to the bearing cone and is assembled on the axle with a substantially heavier press fit than for the bearing cone.

This invention relates to improvements in axle bearing constructions and is particularly related with tapered roller bearings utilized for supporting rotary shafts.

While the present improvement may have a wide range of useful applications, its features and characteristics will be set forth primarily in connection with flanged rear axle shafts of passenger automobiles. In such an automobile application the flanged axle shaft is called upon to support the weight of the vehicle in radial loading, and it is also called upon to withstand thrust forces acting axially along the shaft due to cornering maneuvers, wind forces and other applied loads such as a wheel striking a curb or other fixed object. Due to the combination of these axial and radial loadings, the axle shaft undergoes deflection in varying degrees as it rotates. The rotary deflection of the axle shaft introduces the serious problem of creep in the supporting bearing location. Because of the elasticity of the metal parts of a bearing, the bearing is constantly subjected to forces imposed thereon by the axle deflection which tend to move the bearing axially from its desired location, or there is a tendency of the axle and bearing to undergo relative shifting or creeping from a desired positional alignment. These and other problems are difficult to overcome, and introduces a serious problem of early bearing failure or axial failure.

It is an important object of the present invention to overcome the foregoing problems by providing an axle bearing which is positionally stable relative to the axle supported thereby.

It is also an important object of the present invention to provide a bearing construction with means for locking the same on the axle to be supported therein so that the bearing and axle will move in a unitary manner.

It is another object of the present invention to provide an improved tapered roller bearing construction with means for locking the cone on the shaft to be supported in the bearing, and to associate the locking means and the cone so that rotating deflection in the axle will be prevented from displacing the cone.

It is still a further object of the present invention to provide a tapered roller bearing with a cone having an extension thereon which acts as a positive means for retaining the bearing position on an axle, said positive retaining means being independent of the axial and radial loads acting on the tapered roller bearing cone.

Other objects and advantages of the present invention reside in the parts and combination of parts hereinafter set forth and described in connection with a preferred embodiment of the invention as is illustrated in the accompanying drawings, wherein.

Figure 1:
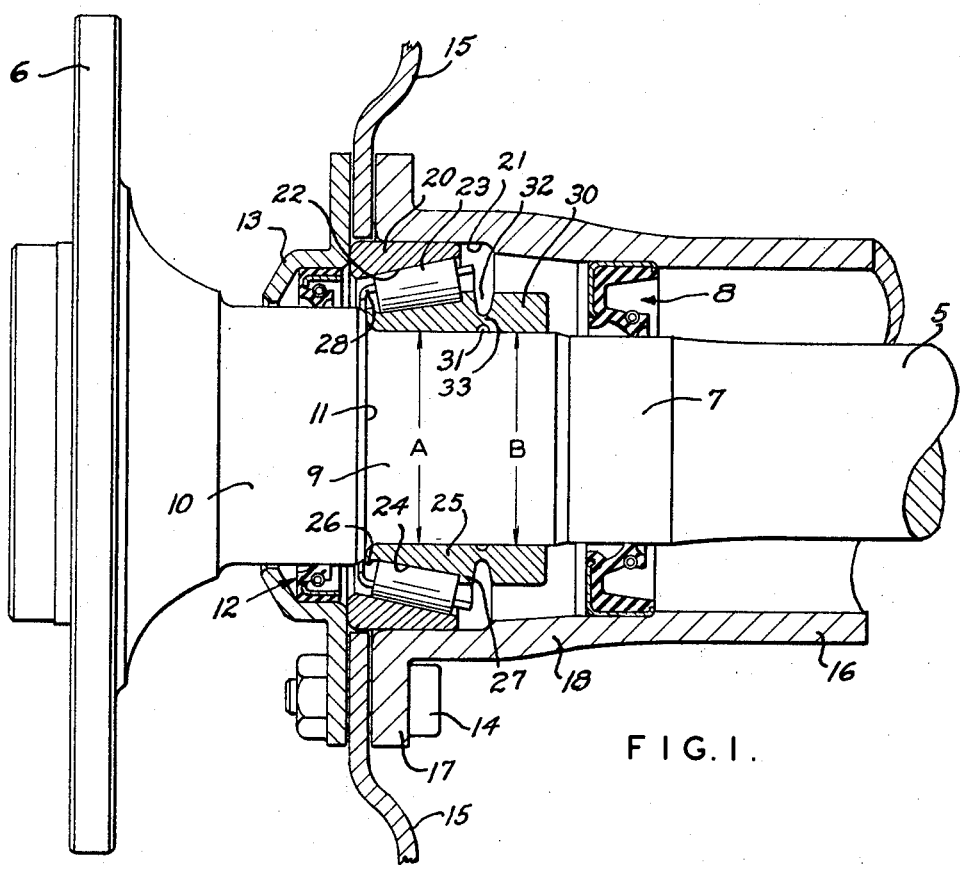
FIG. 1 is a fragmentary, longitudinal, sectional view through a flanged rear axle and bearing mounting therefor to illustrate the features of the axle bearing construction of this invention.

Referring to FIG. 1, it can be seen that the axle 5 is provided with an outer flange 6 to which the usual wheel is attached. Also, the axle 5 is formed with a series of cylindrical areas, the portion 7 being formed to cooperate with an inner lubricant seal 8, an intermediate cylindrical portion 9 being located to receive the tapered roller bearing assembly of this invention, and a still further cylindrical portion 10 being provided with a greater diameter than cylindrical portion 9 to thereby provide a radial shoulder 11 for the tapered roller bearing. The cylindrical portion 10 is adapted to cooperate with a lubricant seal 12 protectively mounted in a removable cover 13 which is secured by means 14 to a part of the structure 15 of the vehicle. The structure 15 also supports an axle housing 16 by a flange 17 on the flared end 18 of housing 16.

The bearing assembly of this invention is seen to comprise a cup 20 which is fitted into a cylindrical recess 21 in the flared end 18 of the housing 16. The cup 20 has an inner tapered raceway 22 to receive a set of tapered rollers 23. The rollers 23 operate on the outer raceway 24 formed in the bearing cone 25. The cone 25 is provided with a thrust rib 26 at its small diameter end and with a thrust rib 27 at its large diameter. The rollers 23 are retained in operating position by means of a cage structure 28 in the usual manner.

It is observed in FIG. 1 that the cone 25 of the bearing assembly is provided with an integral extension or locking collar 30 so that the cone and collar together are fitted on the cylindrical portion 9 of the axle 5 with the outer end of the cone in abutment with shoulder 11. This arrangement of mounting provides a definite location for the bearing assembly. In constructing the integral cone 25 and locking collar 30, it is desired that the internal diameter A for the cone be somewhat larger than the internal diameter B for the locking collar, and that these two diameters be separated by an internal diametral recess 31. It is also desired that the outer surfaces of the cone and locking collar be physically distinct or separated from each other by the annular radially inwardly directed recess 32, which is radially opposite the internal diametral recess 31.

Figure 2:
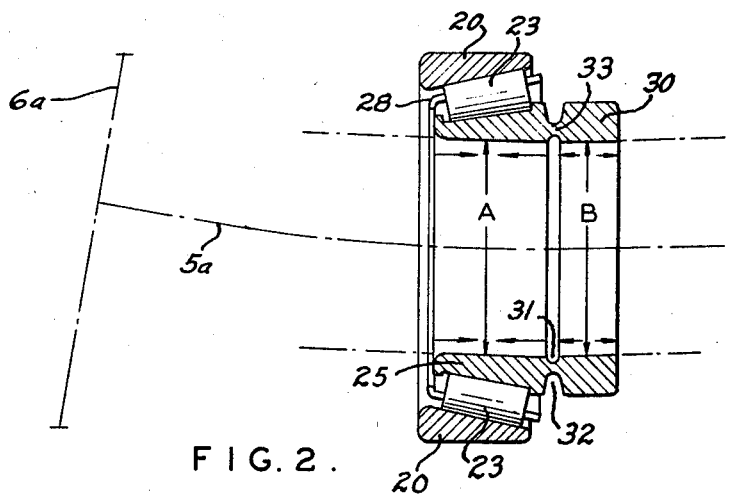
FIG. 2 is a diagrammatic sectional view of the flanged axle and bearing construction to illustrate the various loadings which are imposed on the bearing components.

When formed in this manner there is a relatively thin connecting annular web 33 between the cone 25 and the locking collar 30. The section thickness of the web 33 must be held to a minimum to permit certain bending tendencies as are indicated in FIG. 2 between the cone and locking collar and yet be thick enough to provide for proper hardening or heat treatment of the cone and cup as an integral production part. Thus, as the bearing assembly increases or decreases in size for the size of the axle for which it is designed, the internal diametral recess 31 and the outer annular recess 32 will of course vary, as will the size of the diameters A and B.

It is the purpose of the integral locking collar 30 to secure the cone 25 in its desired positional alignment for the axle 5, and for this purpose the locking collar diameter B is made smaller than the cone diameter A. Thus when the part is assembled on the cylindrical portion 9 of axle 5, the locking collar 30 will require a heavy interference fit and the cone 25 will have a lesser degree of interference fit. It is understood that there are different types of interference fits in which a "light drive fit" requires only light assembly pressures and produces more or less permanent assemblies which are suitable for thin sections or long fits as in cast-iron external members. There is also a "medium drive fit" which is suitable for ordinary steel parts or for shrink fits or light sections and are about the tightest fit that can be used with high-grade cast-iron external members. Then there is the "heavy drive fit" which is suitable for heavier steel parts or for shrink fits in medium sections. Beyond the heavy drive fit are types of force fits which are suitable for parts which can be highly stressed or for shrink fits where the heavy press forces required for heavy drive fits are impractical. In the present instance the locking collar 30 has the heavier force fit on the axle 5 than does the cone 25.

Referring to FIG. 2, it is understood that the diagram is an exaggeration to illustrate the condition of axle deflection. As shown, the axial line 5a represents the axis of the axle 5 and the line 6a perpedicular to line 5a represents the flange on the outer end of axle 5. The parts of the bearing assembly are given the refernece numerals previously described. It will be noted in FIG. 2 that the web 33 is located to be axially to one side of the area of the cone 25 which is under the tapered rollers 23, thereby removing the web 33 from being directly affected by the loads experienced by the cone 25. The web 33 therefore acts to fully isolate the locking collar 30 from being influenced by the loads in the cone 25. Therefore, the annular web 33 connecting the cone 25 and the locking collar 30 is free to respond to the forces in the bearing assembly in either bending or in axial tension or compression. The web 33 is rendered effective in the manner just described by reason of the diametral recess 31 which segregates the axially directed tension and compression forces in the bearing and axle assembly. Thus, the tension and compression forces act independently in the area of internal diameter B of the locking collar from the tension and compression forces acting in the area of internal diameter A of the cone 25. Relative bending reaction between the cone 25 and locking collar 30 is permitted because of the external annular recess 32, and the recess 32 provides an extra feature in the present bearing assembly since it is nicely located to receive the usual type of bearing puller tool for removing the bearing assembly from the axle 5.

The present bearing construction has certain important advantages not present in bearing assemblies heretofore available. Because of the elasticity of the metal, the cone 25 is plastically deforming by the rollers 23 as they pass over the load zone on the cone 25. Under heavy loading conditions the rollers 23 set up a kneading action on the surface of the raceway 24 of cone 25. This kneading action is combined with the momentary elastic stretching of the cone in the heavily loaded zones, and the resulting combination asserts a tendency on the part of the cone 25 to relieve the fit in the area of diameter A. Thus, at any given instant there is a tendency in the bearing cone 25 to relieve its press-fit on axle 5 at diametrally opposite zones, and because the axle 5 is also subjected to a degree of bending as illustrated by the curvature of the axial line A, the cone press-fit is relieved progressively around the axle 5 which sets up a walking action around the internal circumference of the cone 25, causing the cone 25 to creep in an axial direction.

The foregoing action is characteristic of the usual bearing cone without an integral locking collar. In the present bearing construction the locking collar 30 is given a heavy press-fit on the axle 5 so that it has a grip on the axle which is independent of and free of radial loads. Due to the ability of the annular web 33 to accommodate itself to the relative kneading action occurring in the cone 25, the locking collar 30 is completely isolated and maintains its intended grip at the diameter B on axle 5. Thus the locking collar 30 performs its intended function of remaining stationary on the axle 5 and prohibits the cone 25 from gripping or getting out of its intended positional alignment. It has been pointed out above that the annular web 33 must be sufficiently thick to provide the proper hardening or heat treating and must be sufficiently thin to permit bending tendencies. It is also important to size the annular web 33 so that it will be strong enough to resist fatigue failure and also be strong enough to permit the use of bearing puller tools in the outer annular recess 32.

While the characteristics and features of the present axle bearing construction have been set forth above, it is to be understood that variations may be made in the various parts and components so that the benefits of the present invention may be realized in connection with a range of bearing sizes. It will be sufficient for present understanding to give one example of a bearing construction which has fully demonstrated the advantages and utility of the present improvement. The tapered roller bearing of this example had an internal diameter A for the cone 25 varying between 1.5625 inches to 1.5635 inches, an external cup diameter varying from 2.8760 inches to 2.8750 inches, and the locking collar 30 had diameter B sized to vary from 1.5593 inches to 1.5598 inches. The diametral recess 31 was located approximately ½ inch from the outer free end of the locking collar 30, whereas the overall axial length of the cone 25 and locking collar 30 was approximately 1.430 inches. The depth of the recess 31 was approximately .02 inch. The annular recess 32 was formed with a bottom curvature of .06 inch radius and the outer generally radially directed walls of the recess were formed at approximately a 15 degree angle from a plane perpendicular to the axis of the bearing. Stated differently, the annular recess 32 had its side walls flared outwardly of the bottom to form an included angle of 30 degrees. It is pointed out that it is detrimental to the tapered roller bearing cone to fit the same on a shaft or other part with too great a hoop stress because of the kneading action of the rollers under heavy load. On the other hand, the fit of the cone on its shaft can be held to proper tolerances indepently of the locking collar, while the locking collar can be more tightly fitted on the shaft or other part because it is not subjected to radially applied loads, but must resist only tension or compression, as any bending tendencies that are created due to bending of the axle will be compensated for in the web 33.

While a preferred embodiment of the present invention has been illustrated in the drawings and described in the foregoing specification, it is understood that variations in size and proportion of the components are to be included within the appended claims.

I claim:

1. An axle bearing construction comprising a rotary shaft normally subject to radial loads and axially directed loads which combine to cause the shaft to deflect as it rotates, a cone having a shaft receiving bore and an outer tapered raceway, a set of tapered roller engaged on said outer raceway, a cup having an inner tapered raceway engaged on said rollers, and a locking collar integrally joined to said cone, said locking collar having a shaft receiving more smaller than said cone bore, said collar requiring a greater force to assemble it on the shaft than for said cone whereby said collar retains said cone in position on the shaft.

2. The axle bearing construction set fourth in claim 1 wherein said cone and locking collar are connected by an annular web formed by radially opposite internal and external annular recesses, said web acting to isolate said collar from loads on said cone.

3. The axle bearing construction set forth in claim 1 wherein the joining of said cone and collar is by an annular web which has an inner surface the diameter of which is greater than the internal diameter of either said cone and locking collar, and said web has an outer surface forming the bottom of an annular recess between said cone and locking collar.

References Cited
UNITED STATES PATENTS

| | | | |
|---|---|---|---|
| 2,001,193 | 5/1935 | Hedgecock | 308—236 |
| 2,166,391 | 7/1939 | Borland | 308—236 |

MARTIN P. SCHWARDRON, *Primary Examiner.*

FRANK SUSKO, *Assistant Examiner.*

UNITED STATES PATENT OFFICE
CERTIFICATE OF CORRECTION

Patent No. 3,397,021                                           August 13, 1968

Brian Fitzsimmons

It is certified that error appears in the above identified patent and that said Letters Patent are hereby corrected as shown below:

Column 4, line 69, "more" should read -- bore --.

Signed and sealed this 17th day of February 1970.

(SEAL)
Attest:

Edward M. Fletcher, Jr.                      WILLIAM E. SCHUYLER, JR.
Attesting Officer                                    Commissioner of Patents